Figure 1:
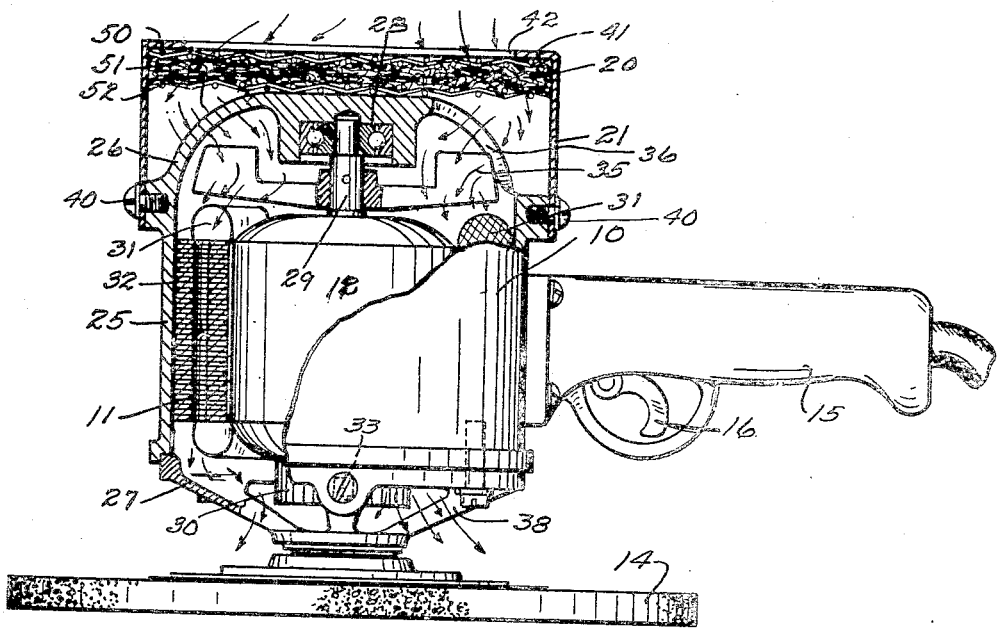

Sept. 4, 1934.  B. B. RAMEY  1,972,315
DUST ELIMINATOR FOR ELECTRIC MOTORS
Filed July 1, 1931

Inventor
Blaine B. Ramey
By Bates, Goldrick & Teare
Attorneys

Patented Sept. 4, 1934

1,972,315

UNITED STATES PATENT OFFICE 1,972,315

DUST ELIMINATOR FOR ELECTRIC MOTORS

Blaine B. Ramey, Stoneleigh, Md., assignor to Black & Decker Manufacturing Company, Towson, Md., a corporation of Maryland Application July 1, 1931, Serial No. 548,108

2 Claims. (Cl. 172—36)

This invention relates to a dust eliminator for use with portable electric tools, such as portable grinders, sanders, hammers and saws.

Portable electric tools, such as grinders and the like, generally comprise an electric motor mounted in a suitable casing, and provided with a handle by which it may be carried and held for operation. Drivingly connected to the armature of the motor is a suitable tool, such as a grinding disc, a hammer or a saw, the operation of any of which creates considerable dust. The motors used for said tools are the ordinary type, relatively small, electric motors, which are cooled by a ventilating fan mounted within the motor casing. The fan is arranged to draw air from outside the motor to within the casing, forcing it therethrough and discharging it from the opposite end of the casing. In electric tools, such as heretofore mentioned, it is highly desirable to provide a compact structure. Hence, in most instances the tool itself, such as a grinding disc or a rotary saw plate, is fixed to the armature shaft of the motor. However, in some instances the tool is driven from a counter-shaft which is geared to the motor. However, in both types, the tool lies relatively close to the motor. Hence, the various kinds of dust, resulting from the action of the tool on the work, are drawn into the motor casing by the ventilating fan of the motor unit, and forced along with the air current around through the motor windings, depositing a considerable amount of this dust on the motor winding and the brushes, thereby causing a considerable reduction in the efficiency of the motor, and often resulting in a premature failure thereof, which is not the case in other electrically operated portable tools wherein the operation does not create dust.

The general object of this invention, therefore, is to construct a motor in such a manner as to prevent the dust, resulting from the action of the tool on the work, from passing into the motor unit, and thereby increase the life of said motor.

A more specific object of this invention is to provide an arrangement for use in connection with an electrically operated portable tool, which arrangement will prevent the dust from passing into and accumulating on the motor unit, but which at the same time will allow complete ventilation of the motor.

Other objects of this invention will become apparent from the following description, referring to a preferred embodiment illustrated in the accompanying drawing, and the essential novel characteristics of the invention will be set forth in the claims.

Figure 2:
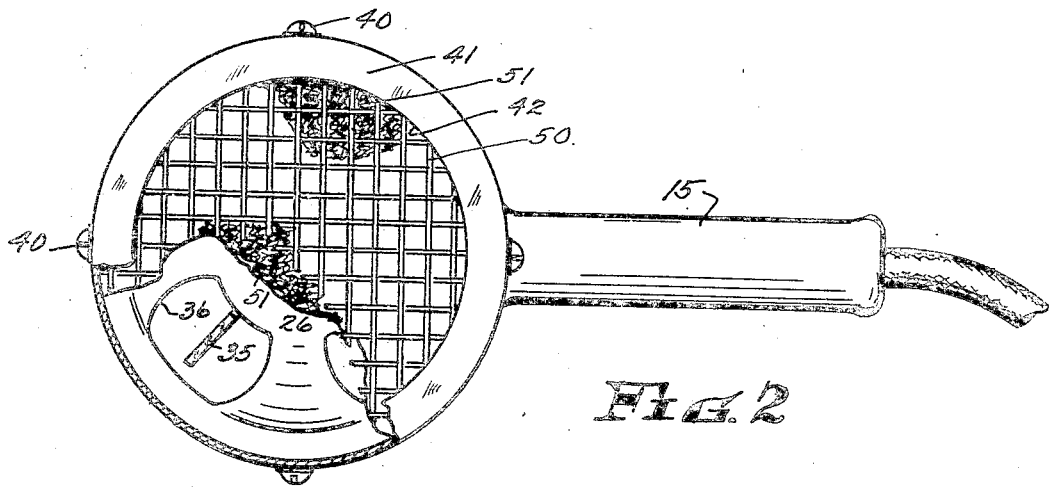
Figure 3:
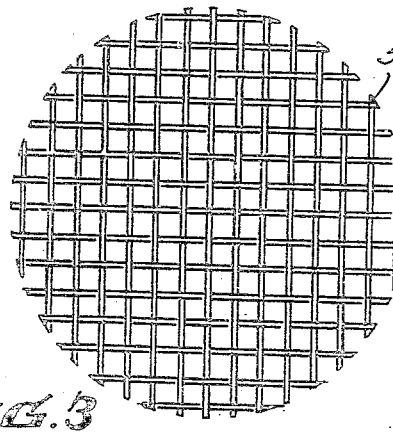
Figure 4:
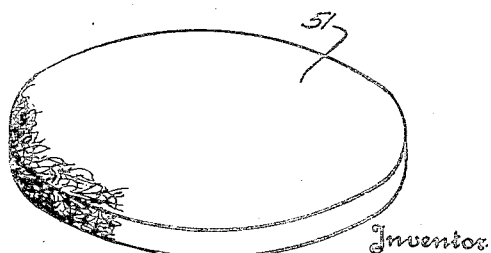

Referring again to the drawing, wherein I have shown a preferred embodiment of my invention, Fig. 1 is an elevation, partly broken away to show the internal construction thereof, of a portable electric tool embodying my invention; Fig. 2 is an end elevation of the tool illustrated in Fig. 1, partly broken away to show the internal construction thereof; Fig. 3 is a plan of a retaining member for my dust collector; Fig. 4 is a perspective of the replaceable dust-collecting element.

Referring again to the drawing, wherein I have shown a preferred form of my invention, in connection with a portable electric grinding tool 10, comprising a motor, generally indicated at 11, and provided with an armature 12, to which is rigidly secured a grinding or abrasive disc 14. A suitable handle 15 is rigidly secured to the motor casing, and may contain certain operating controls, such as the switch control arm 16. While I have shown my invention as embodied in a grinding tool, I nevertheless contemplate its use in connection with other portable electric tools. As shown in the drawing, my dust collecting unit is generally indicated at 20, and is contained within a casing 21, mounted at the end of the motor opposite the tool 14.

The motor shown in the drawing is a representation of a type of motor generally used for portable electric tools. However, I contemplate using various forms and types of motors. The motor 10, as illustrated, comprises a casing 25, provided with end plates 26 and 27, which carry suitable bearings 28, in which the armature shaft 29 is mounted. The shaft 29 is provided with the usual armature 12 and commutator 30. Suitable brush members 33 are mounted in the end plate 27 and are arranged to coact with the armature in the usual manner, the electric circuit thereto being controlled by the switch lever 16. The field coil arrangement comprises the usual coil members 31, mounted on a suitable laminated core 32. The armature shaft 29 adjacent the commutator end, projects some distance beyond the casing and has rigidly secured thereto an abrasive disc 14. At the opposite end of the armature shaft 29, intermediate the armature 12 and the bearing 28, is mounted a fan 35, arranged to draw air through suitable openings 36 in the end frame member 26. The fan 35 forces such air through openings 37 in the field and between the field and armature, discharging it through suitable openings 38 in the opposite end plate 27.

The arrangement so far described is generally found in portable electric tools of the type mentioned.

In electric tools, and especially grinding or abrasive tools, it is readily seen that the action of the tool on the work creates considerable dust, which dust is drawn by the fan 35 into the motor. Quantities of this dust become lodged in the field, on the commutator and in all crevices of the motor and serve to materially reduce the efficiency of the motor and cause an early failure thereof. This is especially true when the dust is metallic dust, which, when allowed to accumulate on the commutator, causes short circuits, which result in arcing and subsequent failure of the motor.

I prefer to prevent the deterioration of the motor due to this dust by preventing the dust from entering the motor, but at the same time providing complete ventilation for the motor parts. In the embodiment illustrated, I mount a cylindrical casing 21, on the end of the motor opposite the tool, and through which end, air is drawn into the motor by the fan 35. This housing is conveniently cylindrical in form and is secured to the motor by suitable screws 40.

The casing 20 is in the nature of a round cup, with the bottom stamped out as indicated at 42, providing a flange 41. In this circular cup is placed a wire mesh screen 50, and then a mat or pad of metallic wool 51, and on top of this a second wire mesh screen 52. The arrangement is such that when the cup 20 is drawn up in place on the motor, the metallic wool pad 51 will be clamped between the two wire screens 50 and 52, one of which coacts with the inner surface of the flange 41, and the other of which bears against the outer face of the end plate 26 of the motor.

To raise the efficiency of the dust collector, I prefer to dip the pad 51 in oil and then permit the excess oil to drain off. The oil which remains in the pad then causes the metallic wool to catch the dust more readily. The arrangement is such that the operator may remove a certain amount of the dust that collects in the mat by simply tapping the unit down on the dust covered end. However, it will be noted that the unit 20 is readily removed from the motor without disturbing the bearing arrangement or in any other way affecting the operation of the motor or tool itself. Therefore, the operator may, by removing the screws 40, remove the cup 21 and replace the pad 51 with a new one.

I have found that metallic wool prevents the dust that would ordinarily pass through the motor from entering the casing, but at the same time, due to the area of the pad, does not restrict the circulation of air through the motor. By eliminating the dust, I prevent deterioration of the electrical parts, together with the attendant break-downs and early failure of such tools.

From the foregoing description, it will be seen that I have provided a dust-collector for use in connection with portable, electric tools, which will prevent the dust from entering the motor and causing injury to the motor parts by short circuits and the like, and it will be noted that I have accomplished this result without materially affecting the circulation of air currents through the motor, and likewise it will be seen that my dust collector may readily be secured in place upon portable tools now in existence.

I claim:

1. A portable electric motor, a motor casing, an armature mounted in the casing, ventilating means within the casing adapted to draw air through openings in the casing and force it through the motor to ventilate the same, a supplementary casing provided with an opening therein and arranged to be detachably secured to the motor casing, said casing being provided with a flange adjacent the opening therein, a dust eliminating closure member for said opening through which air may be drawn, said member being removably retained within said casing by said flange and the end of the motor casing, wherein said closure member is arranged to remove dust from the air, and means to prevent contact between the dust eliminator member and the surfaces on which the motor may be rested.

2. A portable electric motor including a motor casing having openings therein, an armature mounted therein, ventilating means within the casing adapted to draw air through the openings therein and force said air through the motor to ventilate the same, an open ended supplementary casing secured to one end of said motor housing, a closure member for the opening in the supplemental casing and comprising a mat of metallic wool through which air may be drawn, said member being spaced apart from the motor casing in the region of the openings therein, and wherein said mat is saturated with an oily substance to cause dust and the like to adhere thereto.

BLAINE B. RAMEY.